United States Patent [19]

Garzia

[11] Patent Number: 4,600,725
[45] Date of Patent: Jul. 15, 1986

[54] ESTERS OF A BENZOYL ALKANOIC ACID AND BENZYLIC ALCOHOL

[75] Inventor: Aldo Garzia, Rimembranze, Italy

[73] Assignee: Vittadini Gianluigi, New York, N.Y.

[21] Appl. No.: 608,129

[22] Filed: May 8, 1984

[51] Int. Cl.⁴ .................................... C07C 69/76
[52] U.S. Cl. ............................. 514/545; 560/51; 560/53
[58] Field of Search .................. 560/51, 53; 514/545

[56] References Cited

PUBLICATIONS

Saigo, K. et al., Bull. Chem. Soc. Japan, vol. 50 (7) 1863–1866, 1977.

*Primary Examiner*—Paul J. Killos
*Attorney, Agent, or Firm*—Henry M. Feiereisen

[57] ABSTRACT

Esters of a benzoyl alkanoic acids and a benzylic alcohol as a growth promoting agent for a wide variety of animals are provided. The esters influence production of growth hormones resulting in an increase in weight/growth in animals.

8 Claims, No Drawings

ESTERS OF A BENZOYL ALKANOIC ACID AND BENZYLIC ALCOHOL

BACKGROUND OF THE INVENTION

This invention relates to esters of a benzoyl alkanoic acid and a benzylic alcohol as a growth promoting agents, and more particularly to benzylic esters of benzoyl alkanoic acids which aid in the simulation of production of growth hormones in a wide variety of animal species, their method of preparation and method of administration.

A wide variety of materials have been utilized in efforts to increase the weight/growth ratio in animals. This is desirable in order to increase the amount of meat available within a given period of animal growth. However, the materials tested are often hormones which are detectable as residues in the animal meat, prove to be toxic or have some undesirable side effect. One such compound is zeranol which is an anabolic steriod described in U.S. Pat. No. 3,239,345.

Accordingly, it is desirable to provide a new growth promoting agent which is effective and overcomes any undesirable effects present in growth promoting materials known in the prior art.

SUMMARY OF THE INVENTION

Generally speaking, esters of a benzoyl alkanoic acid and a benzylic alcohol as a growth promoting agent for a wide variety of animals are provided. The benzylic ester growth promoting agents are prepared by reacting equi-molar quantities of beta-benzoyl alkanoic acid and 3,4,5-tri-alkoxy benzylic alcohol in an organic solvent in the presence of an acid catalyst. The resulting benzylic ester of a benzoyl alkanoic acid simulates production of growth hormones in the animal resulting in an increase in the weight growth ratio.

The preferred ester of a benzoyl alkanoic acid and a benzylic alcohol may be represented by the general formula:

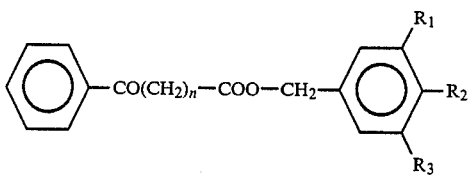

wherein n is an integer from 1 to 4 and $R_1$, $R_2$ and $R_3$ are hydrogen or a lower alkoxy group having from 1 to 3 carbon atoms. The preferred ester in accordance with the invention is 3,4,5-tri-methoxy benzylic ester of beta-benzoyl propionic acid.

The benzylic ester of a benzoyl alkanoic acid may be administered orally or intra-muscularly. Generally, the active dosage is between about 0.5 to 5 miligrams of ester per kilogram of animal weight and may be administered from at least three times per month to every day for one month.

Accordingly, it is an object of the instant invention to provide an improved growth promoting agent for animals.

It is a further object of the instant invention to provide an improved growth promoting agent for an animal which does not have any undesirable side effects.

It is another object of the invention to provide an improved growth promoting agent suitable for increasing the weight/growth ratio in a wide variety of animal species.

Still another object of the invention is to provide an ester of a benzoyl alkanoic acid and a benzylic alcohol as a growth promoting agent.

Still a further object of the invention is to provide a method for preparing as ester of a benzoyl alkanoic acid and a benzylic alcohol as a growth promoting agent.

Yet another object of the invention is to provide a method for increasing the weight/growth ratio in a wide variety of animal species by administering an ester of a benzoyl alkanoic acid and a benzylic alcohol.

Still other objects and advantages of the invention will in part be obvious and will in part be apparent from the specification.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

DESCRIPTION OF THE PREFERRED EMBODIMENTS

The esters of a benzoyl alkanoic acid and a benzylic alcohol in accordance with the invention are growth promoting agents for humans and a wide variety of animal species, such as calves, swine, sheep, horses, rabbits and poultry. The benzylic esters do not have any undesirable side effects and are not hormones, are not vitamins, are not antibiotics nor chemotheraputic agents. It is believed the growth promoting action is due to muscular relaxation and sedative effects of the ester which results in stimulation of the production of growth hormones.

The esters of a benzoyl alkanoic acid and benzoyl alcohol in accordance with the invention may be represented by the following general formula:

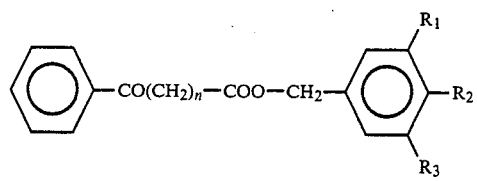

wherein n is between 1 to 4 and $R_1$, $R_2$ and $R_3$ are hydrogen or a lower alkoxy group having from 1 to 3 carbon atoms.

The preferred benzylic ester in accordance with the invention is 3,4,5-tri-methoxy benzylic esters of beta-benzoyl propionic acids having the following general formula:

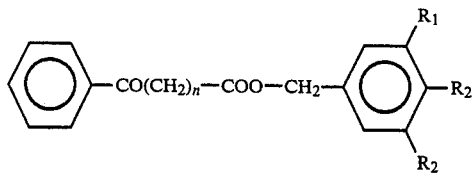

The esters of a benzoyl alkanoic acid and a benzylic alcohol in accordance with the invention are prepared by reacting equi-molar quantities of a beta-benzoyl alkanoic acid having the general formula:

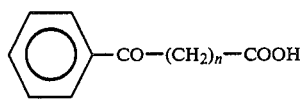

wherein n is an integer from 1 to 4, and a 3,4,5-trialkoxy benzylic alcohol having the following formula:

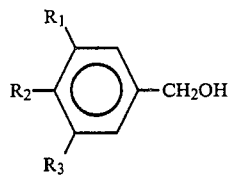

wherein $R_1$, $R_2$ and $R_3$ is a lower alcoxy group having from 1 to 3 carbon atoms. The acid and alcohol are reacted in an organic solvent, such as for example benzene in the presence of an acid catalyst, such as HCl. The solvent is distilled under vacuum and the residue after recrystalization from ethanol generally yields between 70 to 80% ester.

The following examples are set forth to illustrate preparation of the ester of a benzoyl alkanoic acid and a benzylic alcohol in accordance with the invention and its effectiveness in increasing the weight/growth of animals tested. These examples are set forth by way of illustration only and not intended in a limiting sense.

EXAMPLE 1

The ester 3,4,5-tri-methoxy benzylic ester of beta-benzoyl propionic acid was prepared by reacting 17.8 grams of beta-benzoyl propionic acid and 19.8 grams of 3,4,5-tri-methoxy benzylic alcohol in 500 ml of dry benzene in the presence of about 1 grams of HCl gas. After addition of the ingredients the reaction mixture was refluxed for three hours. The benzene solvent was removed by distillation under vacuum and the residue was crystallized from ethanol yielding 29.7 grams of ester representing a 79% yield.

EXAMPLE 2

The 3,4,5-tri-methoxy benzylic ester of beta-benzoyl propionic acid prepared in Example 1 was prepared as a 2% solution in propylene glycol. The solution was sterilized prior to adminstration. Bulls weighing about 500 kilos were administered intramuscularly with 10 ml of the solution on the first day, with 10 additional mililiters after fifteen days and 10 additional mililiters after fifteen additional days. This administration of 10 mililiters every fifteen days continues to sixty days from beginning of treatment. After the sixtieth day, the body weight of the bull increased 18% in comparison to untreated controls.

EXAMPLE 3

A 2% solution of the ester prepared in Example 1 in propylene glycol was prepared. A calf weighing 60 pounds was injected intramuscularly with the equivalent of 17 miligrams of ester once every ten days for 30 days. After sixty days the calf showed a weight increase of 15% in comparison with untreated control calves of the same age.

EXAMPLE 4

A calf weighing 60 pounds was administered the ester prepared in Example 1 orally. Every ten days 20 miligrams of the ester of Example 1 diluted as in Example 2 was mixed into feed or water. After sixty days the calf showed a weight increase of 15% versus a group of control calves of the same age.

EXAMPLE 5

The procedures of Examples 3 and 4 were followed for an adult bulls weighing about 1,000 pounds. Administration of the equivalent of 17 miligrams of ester diluted once every 15 days for 60 days resulted in a weight increase of 12% cover controls. When a total of 60 miligrams of water was injected, the weight increase after fifty-four days was 12% greater than the controls. Thus, the ester promoted the weight/growth ration in older animals.

EXAMPLE 6

The procedures of Examples 1–5 were repeated on calves, goats, sheep, pigs, turkeys, rabbits (oral dosages only) and chickens (oral dosages only). The weight increases were generally between 12 to 15% greater than the controls.

The benzylic ester of a benzoyl alkanoic acid may also be administered to humans to attain the same increase in weight/growth. The esters prepared in accordance with the invention are highly desirable as they are not hormones, are not toxic or carcinogenic and do not have any noticeable side effects. Significantly, the esters are not detectable in animal meat indicating there are no existing residues in the tissue. Similarly, the esters have been found not to be transferrable to offspring.

In addition to the increase in weight/growth in animals and the non-deleterious effects of the growth promoting agent, the esters have a tranquilizing effect on the animal at slaughter. This tranquilizing effect reduces cannibalism and eliminates the need for other anti-stress supplements generally used to control cannibalism at slaughter. Quite significantly, the ratio of fat to protein in the animal does not change and the esters are not mutagenic.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. The method of promoting growth in animals, comprising administering at least a growth promoting effective amount of an ester of a benzoyl alkanoic acid and a benzylic alcohol.

2. The method of claim 1, wherein the benzylic ester of a benzoyl alkanoic acid is a compound having the following formula:

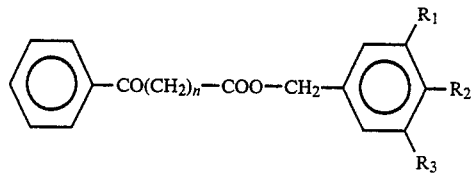

wherein n is an integer from 1 to 4 and $R_1$, $R_2$, $R_3$ are hydrogen or a lower alkoxy group having from 1 to 3 carbon atoms.

3. The method of claim 1, wherein the ester is 3,4,5-tri-methoxy benzylic ester of beta-benzoyl propionic acid.

4. The method of claim 1, wherein the dosage of ester administered is between about 0.5 to 5 miligrams per kilogram of animal weight.

5. The method of claim 1, wherein the ester is administered orally.

6. The method of claim 1, wherein the ester is administered intra-muscularly.

7. A growth promoting agent composition comprising a minimum growth promoting effective amount of an ester of a benzoyl alkanoic acid and a benzylic alcohol in a vehicle.

8. The growth promoting agent composition of claim 7, wherein the vehicle is propylene glycol.

* * * * *